April 3, 1962   S. S. FLASCHEN ET AL   3,028,447
CONDUCTORS INSULATED WITH ALUMINUM FLUORIDE
Filed Oct. 22, 1958   2 Sheets-Sheet 1

INVENTORS  S. S. FLASCHEN
           P. D. GARN
BY
George S. Indig
ATTORNEY

INVENTORS S. S. FLASCHEN
P. D. GARN
BY
ATTORNEY

United States Patent Office 3,028,447
Patented Apr. 3, 1962

3,028,447
CONDUCTORS INSULATED WITH ALUMINUM FLUORIDE
Steward S. Flaschen, New Providence, and Paul D. Garn, Madison, N.J., assignors to Bell Telephone Laboratories, Incorporated, New York, N.Y., a corporation of New York
Filed Oct. 22, 1958, Ser. No. 768,973
5 Claims. (Cl. 174—113)

This application relates to electrically insulated conductors made by coating the conductor surface with a metal fluoride film.

There are innumerable applications in modern technological systems which require insulated electrical elements. Such insulation may take the form of plastic, paper, fibrous material and the like. Electrical elements so insulated include: conductive elements such as resistors and inductors; semiconductive elements such as rectifiers, transistors and thermal devices; structural members such as motor casings, radio chassis and cable sheathings; and primary conductors such as wires and the like. The term "electrical element," as used in this specification and the appended claims, is intended to include all such elements.

The coatings of the present invention are suitable for use in all instances where insulation of an electrical element is required. Insulating coatings produced in accordance with this invention are strongly adherent, flexible, and are possessed of a high breakdown voltage. The flexibility and adherence of such coatings render them highly desirable for the insulation of wires, conduits and cables, all of which may be bent, flexed or twisted during use. The increased interest in electrical devices which operate at elevated temperatures has evolved a need for a method of producing heat-resistant insulation which is applicable to a wide variety of metals. For example, transformers designed to operate in high temperatures must be fabricated using coils which are insulated with heat-resistant material. In accordance with the present invention, insulating coatings having excellent high temperature characteristics are produced on a variety of materials.

Insulating materials are also required in the fabrication of electrical capacitors. The insulation is employed in the form of a dielectric layer which is interposed between the conducting plates of the capacitor. Heretofore, paper was one of the chief dielectric materials used. The capacitance of devices so fabricated was limited by the thickness of the paper necessary to achieve the desired breakdown voltage. Replacement of the paper by the thin films produced in accordance with this invention results in a device of increased capacitance per unit volume.

The films of the present invention may also be used in place of the anodized dielectric film of solid and wet electrolytic capacitors.

The present invention consists of the formation of a film of at least one metal fluoride on the surface of an electrical element. The metal fluoride film may be produced by either of two general methods. The first method consists of reacting the metal surface to be insulated with an oxidizing carrier of fluorine to form a metal fluoride film in situ. The alternative method contemplates the deposition of a metal fluoride film on the surface to be protected. Where applicable, the first method is considered superior for some purposes, in that the films are more flexible and more strongly adherent to the underlying surface.

The invention will be better understood from the following detailed description taken in conjunction with the drawings in which.

For clarity of exposition, none of the figures is drawn to scale, and the thickness of the insulating coatings have been exaggerated.

Figure 1:
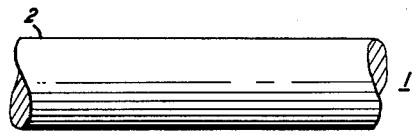
FIG. 1 is a perspective view of a length of a wire conductor prior to treatment in accordance with the present invention.

With respect now, more particularly, to FIG. 1, there is depicted a cross-sectional view of a length of wire 1 whose surface 2 is to be treated in accordance with the present invention. As indicated above, the present invention is applicable in all situations in which it is desired to produce an electrically insulated coating upon the surface of an electrical element. The particular inventive procedure employed to produce the insulating coating is, in many instances, merely a matter of choice or convenience. However, in the insulation of certain materials in accordance with this invention, use of a specific method may be dictated by the nature of the material to be insulated.

The method of producing an insulating coating of this invention by direct reaction wtih the surface is limited to a class of metals and allows which meet certain requirements. The first, and perhaps obvious requisite, is that the metal or alloy be sufficiently reactive to form a fluoride. The absence of such capability eliminates metals such as gold and platinum from this class.

To be included in the class suitable for treatment in accordance with this aspect of the invention, the fluoride of the metal or alloy should be a solid at ambient temperature. This requirement eliminates elements such as silicon and titanium.

An important requirement of the metal fluoride is that it have little or no tendency to hydrate or decompose in the presence of water vapor. Thus, metals such as silver and cobalt whose fluorides are hydrophilic, are not included in the aforementioned class of suitable metals.

The metals and alloys which exhibit none of the aforementioned infirmities, and which may be insulated in accordance with this aspect of the present invention include such materials as magnesium, aluminum, and aluminum alloys, chromium, iron, nickel, copper, zinc, lead, zirconium, and also alloys thereof, including Monel metal, the various brasses and stainless steels and bronzes.

Should the surface to be protected be composed of a material not included in the above-described class, an alternative method is employed to produce the insulating fluoride coating. In this alternative method the surface is contacted with a metal fluoride in vapor or liquid form. Thus, for example, a silver surface may be insulated by depositing a coating of copper fluoride from the vapor phase.

Figure 2:
FIG. 2 is a perspective view, partly in section, of the wire depicted in FIG. 1, coated with an insulating film produced in accordance with the present invention.

FIG. 2 is a perspective view, partly in section, of the length of wire 1 after treatment in accordance with this invention to produce fluoride coating 3 shown exaggerated in thickness.

Figure 3:
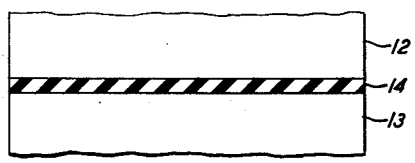
FIG. 3 is a cross-sectional view of a portion of a capacitor having a dielectric produced in accordance with the present invention.

FIG. 3 is a cross-sectional view of a portion of a capacitor produced in accordance with this invention. Elements 12 and 13 represent conducting plates, and layer 14 represents a fluoride film dielectric produced in accordance with this invention. Such a configuration may be employed to produce stack capacitors of the type described in copending application Serial No. 742,068, filed June 16, 1958.

The excellent electrical and physical properties of insulating films of this invention render them suitable for use as dielectrics in foil-type capacitors. For such use, a thin sheet of one of the metals or alloys described above is reacted with an oxidizing carrier of fluorine to produce an insulating fluoride film over its entire surface. The coated sheet, together with a second metal electrode in the form of a separate sheet or deposited metal film is wound to form a spiral configuration. An electrical contact is made independently to each of the two electrodes, and lead wires connected thereto. The device is then sealed in a can or wrapped in paper. Such a capacitor is shown in FIG. 4.

Figure 4:
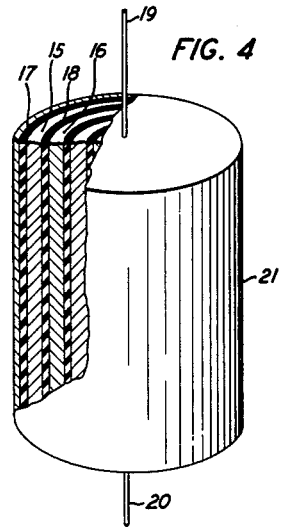
FIG. 4 is a perspective view, partly in section, of a foil capacitor produced in accordance with this invention.

Seen in FIG. 4 are the two metallic electrodes 15 and 16, and fluoride layers 17 and 18 on each face of sheet 15. Wire leads 19 and 20 emerging from cam 21 make electrical contact with electrodes 15 and 16.

The capacitance of the structure depicted in FIG. 4 may be increased by introducing an electrolyte into the can. The electrolyte increases the effective area of the sheets by improving the contact between the uninsulated sheet and the insulating film.

Figure 5:
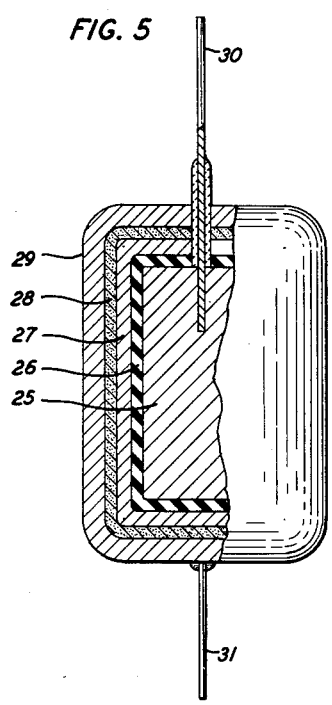
FIG. 5 is a perspective view, partly in section, of a solid electrolytic capacitor employing a porous anode produced in accordance with this invention.

FIG. 5 is a perspective view, partly in section, of a solid electrolytic capacitor employing a porous anode 25 produced in accordance with this invention. A sintered porous body produced in the customary manner is treated in accordance with this invention to produce a thin fluoride layer 26 over its entire surface. The solid electrolytic capacitor is then constructed in accordance with the applicable procedure steps described in copending application Serial No. 346,416, filed April 2, 1953. Shown in FIG. 4 in addition to anode 25, is electrolyte layer 27, graphite layer 28, metal can 29 and leads 30 and 31.

Porous anodes of the type described above in conjunction with FIG. 5 may also be employed in liquid electrolytic capacitors.

The advances made possible by the present invention may be appreciated from the fact that, heretofore, only those metals which could be electrolytically anodized to form high resistance adherent films were suitable for use in electrolytic capacitors. Such metals are usually termed "film-forming" metals. In accordance with the present invention, non-film forming metals, such as magnesium, chromium, copper and zinc, which are more readily available and less expensive, may be substituted for the tantalum or aluminum anodes presently used.

Figure 6:
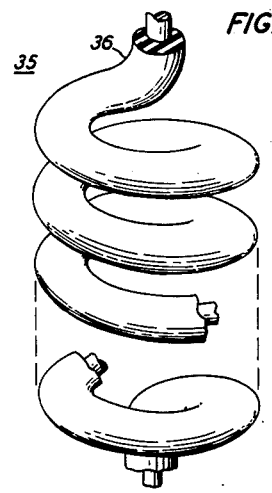
FIG. 6 is a perspective view, partly in section, of an insulated inductor produced in accordance with this invention.

FIG. 6 is a perspective view, partly in section, of an inductor 35 which has been insulated in accordance with the present invention. Inductor 35 is also intended to be representative of a coil suitable for use in a conventional voltage transformer. As indicated in FIG. 6, the entire surface of the inductor is coated with a fluoride layer 36 formed in accordance with this invention. An inductor, such as shown in FIG. 6, may be coated either before or after the wire is coiled.

Another important use of the films of this invention as dielectric materials is in high frequency electrical conductors typified by those described in U.S. 2,769,148, issued October 30, 1956, to A. M. Clogston. Conductors of this general type are advantageous in that the power loss associated with skin effect is reduced. Such conductors comprise a multiplicity of conducting elements which are insulated from each other. The present invention provides a method by which the aforementioned conducting elements may be insulated.

Figure 7A:
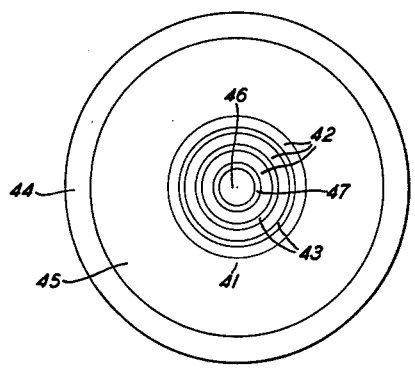
FIGS. 7A and 7B are a front elevational view and side elevational view partly in section, respectively, of a coaxial transmission line utilizing the insulating films of the present invention.
Figure 7B:
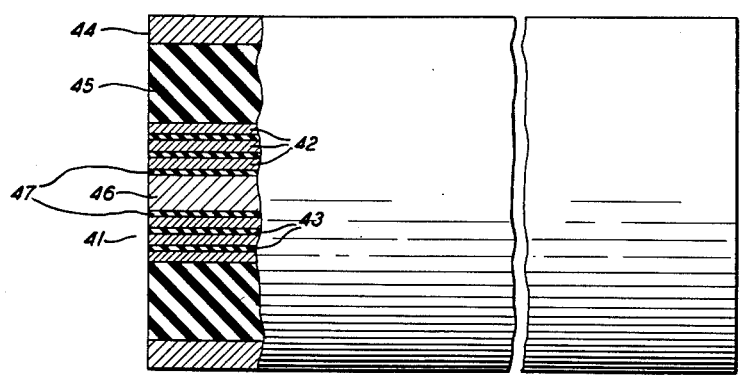

Shown in FIGS. 7A and 7B is one embodiment of the type of conductor described above. FIG. 7A is a front elevational view, and FIG. 7B is a side elevational view partly in section, of a coaxial transmission line 40, consisting of inner conductor 41 and outer conductor 44. Inner conductor 41 is composed of a plurality of coaxial metal conductors 42 separated by coaxial dielectric layers 43. The region between inner conductor 41 and outer conductor 44 is filled with insulating material 45. Core 46 may be filled with metal or a dielectric material. If desired the innermost of coaxial conductors 42 may be insulated on the surface facing the core with insulating layer 47.

The present invention is particularly well suited for the insulation of the cylindrical metal conductor 42. Each of the conductors is treated in accordance with the inventive process to produce a fluoride film on the inner and outer surfaces thereof. The conductors are then assembled to form inner conductor 41.

Each of the devices depicted in the drawings employs an electrical element having a coating produced in accordance with the present invention. However, the drawings are not intended as an exhaustive enumeration of the elements in which insulations of the present invention may be employed.

The fluorine-containing materials which may be reacted with a surface to produce an insulating film in accordance with this invention must contain at least one chemical element which is capable of oxidizing the surface to be treated. It is for this reason that such materials are commonly termed "oxidizing carriers of fluorine." Materials of this type include, among others, gaseous fluorine, liquid fluorine, hydrogen fluoride, the halogen fluorides such as bromine trifluoride and chlorine trifluoride, the fluoromethanes such as fluoroform ($CHF_3$), the fluoroethanes such as difluoroethane ($C_2H_4F$), sulfur fluoride ($S_2F_2$), and sulfur hexafluoride ($SF_6$). The details of the production of an insulating film on a surface by direct reaction with one of the aforementioned fluoridating materials will be discussed in terms of the reaction of an aluminum alloy surface and fluorine gas.

The particular alloy of concern is No. 1100 consisting of approximately 99 percent aluminum. (See "Alloy Designation System for Wrought Aluminum," July 1954, the Aluminum Association, 420 Lexington Avenue, New York, New York.)

Prior to the fluorine treatment, the metal surface is cleaned with a light hydrocarbon solvent such as toluene.

The cleaned aluminum alloy surface is then contacted with fluorine vapor at a temperature of approximately 550° C. for 20 minutes.

As a result of the foregoing treatment, the aluminum surface is found to have a continuous adherent film of aluminum fluoride of approximately 1 micron thickness. Repeated bending of the coated surface to angles of approximately 90 degrees does not impair the adherence of the fluoride coating.

The resistance of the aluminum fluoride film so formed is approximately $10^{11}$ ohms, and its breakdown voltage is approximately 450 volts. The film retains its excellent dielectric properties at elevated temperatures. For example, at a temperature of 500° C., the fluoride film is found to have a resistance of approximately $7 \times 10^8$ ohms and a breakdown voltage of approximately 450 volts.

The maximum temperature at which the above-described type of reaction may be conducted is fixed by the melting point of the surface, which in the instant case, is approximately 660° C. However, another consideration affecting the upper temperature limit of this type of reaction is the volatility of the metal fluoride produced. Thus, in the instance of fluoridating copper, although the melting point of copper is approximately 1083° C., copper fluoride volatilizes readily at 800° C. This latter temperature, then, determines the upper temperature limit of such reaction.

There is no minimum temperature for reactions of this type. The lower limit of the temperature range within which the insulating films of this aspect of the invention are produced is determined by economic considerations. Higher reaction temperatures result in increased reaction rates and consequently the time required to produce a specific thickness of film is reduced. Thus for the above-described reaction of alloy No. 1100 and fluorine, although a reasonably fast reaction rate is obtained at a temperature of 350° C., the reaction is preferably conducted at a temperature of at least 500° C. to obtain an even lower reaction time.

In the same manner, the reaction of copper and gaseous fluorine, which proceeds at a reasonably fast rate at 200° C., is generally conducted at a temperature of at least 300° C. for economic reasons.

The breakdown voltage rating and the electrical resistance of the fluoride coatings of this invention, are determined by its thickness. As the thickness is increased, both the breakdown voltage rating and the electrical resistance of the coating increase. The maximum thickness of coating which may be tolerated is determined by the flexibility and adherence required for the particular application. In general, for thicknesses up to 5 microns, the coating is exceedingly adherent and flexible. However, as the thickness is increased above 5 microns, the film becomes less adherent and less flexible. At thicknesses substantially above 10 microns, flaking and cracking of the coating is encountered.

There are no inherent limitations which dictate a minimum coating thickness, layers as thin as 1/100 micron and thinner being suitable as insulating layers having breakdown voltages of the order of 10 volts. The actual thickness employed is determined by the application involved. Thus, for insulation, a lower limit of thickness is set by the potential difference to which the coating will be subjected. For elements destined for use in capacitors, the thinnest coating consonant with the breakdown voltage desired is used so that capacitance may be maximized.

The surface characteristics of fluoride films of this invention may be altered or modified by further treatment to meet the needs of a specific end use. Illustrative of such modification is the treatment of an aluminum fluoride film, formed by reacting an aluminum surface with an oxidizing carrier of fluorine, with oxygen. The resultant oxygen-treated film is found to have improved abrasion resistance, i.e., increased mechanical wearability. Such treatment also increases the hydropholic properties of the film to such an extent that no hydration of the film is observed even after prolonged contact with boiling water.

Air or other mixtures of oxygen and gases innocuous to the fluoride film may be used to achieve the aforementioned beneficial results. The treatment is preferably conducted at temperatures of the same order of magnitude as those used in the production of the fluoride film. The interdependence of time and temperature is the same as that discussed above in connection with the reaction between the surface and the fluorine carrier.

In certain instances, the same modification of surface properties may also be obtained by adding oxygen to the fluorine-carrier atmosphere during the formation of the fluoride film. This aspect of the oxygen-treatment is suitable for use where the surface will react directly with the fluorine carrier only, and not with the oxygen. The oxygen then reacts with the fluoride film to produce the desirable characteristics.

Listed below are a few examples of the present invention.

*Example 1*

A copper surface was exposed to fluorine vapor at a temperature of 300° C. for approximately 20 minutes. A copper fluoride film, approximately 500 angstroms thick, was obtained. This film was found to have a resistance of approximately $10^{11}$ ohms and a breakdown voltage of approximately 125 volts.

*Example 2*

A copper surface was contacted with fluorine vapor at a temperature of 500° C. for approximately 20 minutes. A copper fluoride film, approximately 1 micron thick, was formed. The fluoride film had a resistance of approximately $10^{11}$ ohms and a breakdown voltage of approximately 250 volts. Additionally, the copper fluoride film was found to be strongly adherent and highly flexible.

*Example 3*

Aluminum alloy 1100 was contacted with hydrogen fluoride vapor at a temperature of 520° C. for approximately 25 minutes. A film of approximately 1 micron thick was formed. This film had a resistance of $10^{11}$ ohms and a breakdown voltage of approximately 500 volts.

It is to be understood that the examples described above are merely representative and intended as illustrative of the processes of this invention. As indicated above, there is a large number of fluoridating materials and fluoride compounds which can be used to produce the insulating coatings of this invention. The enumeration of such materials and the enumeration of the metals and alloys which may be coated therewith are not intended as an exhaustive list, but rather as typical examples of those materials which may be used in conjunction with the present invention. Accordingly, variations may be made by one skilled in the art without departing from the spirit and scope of the invention.

What is claimed is:

1. A capacitor comprising two electrically conducting elements spaced by a dielectric consisting essentially of aluminum fluoride.

2. An electromagnetic wave transmission medium comprising a plurality of elongated conducting portions spaced from each other by a thin insulating film consisting essentially of aluminum fluoride.

3. An electromagnetic wave transmission medium comprising at least two conducting elements in the form of concentric cylinders which are spaced from each other by a thin insulating film consisting essentially of aluminum fluoride.

4. An electrical coil comprising a plurality of aluminum wire conductors separated from one another by a coating consisting essentially of aluminum fluoride.

5. An electrolytic capacitor comprising an anode coated with a thin dielectric film consisting essentially of aluminum fluoride and a cathode adjacent to and in contact with said film.

References Cited in the file of this patent

UNITED STATES PATENTS

| | | |
|---|---|---|
| 1,904,418 | Dantsizen | Apr. 18, 1933 |
| 1,932,639 | Roseby | Oct. 31, 1933 |
| 2,016,155 | Muller | Oct. 1, 1935 |
| 2,047,029 | Muller | July 7, 1936 |
| 2,088,949 | Fekete | Aug. 3, 1937 |
| 2,510,864 | Leonia | June 6, 1950 |
| 2,697,740 | Novak | Dec. 21, 1954 |
| 2,802,897 | Hurd et al. | Aug. 13, 1957 |
| 2,899,345 | Oshry | Aug. 11, 1959 |

FOREIGN PATENTS

| | | |
|---|---|---|
| 427,599 | France | June 1, 1911 |
| 525,847 | Canada | June 5, 1956 |